United States Patent
Zhang et al.

(10) Patent No.: US 8,260,493 B2
(45) Date of Patent: Sep. 4, 2012

(54) HEALTH PROGNOSIS FOR COMPLEX SYSTEM USING FAULT MODELING

(75) Inventors: Yilu Zhang, Northville, MI (US); Mutasim A. Salman, Rochester Hills, MI (US); Kwang-Keun Shin, Rochester Hills, MI (US); Satish Rajagopalan, Knoxville, TN (US); Mark N. Howell, Rochester Hills, MI (US); Xidong Tang, Sterling Heights, MI (US); Hong S. Bae, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 400 days.

(21) Appl. No.: 12/707,516

(22) Filed: Feb. 17, 2010

(65) Prior Publication Data

US 2011/0202227 A1    Aug. 18, 2011

(51) Int. Cl.
    *G06F 7/00* (2006.01)
(52) U.S. Cl. .................. 701/34.4; 701/32.9; 701/32.1
(58) Field of Classification Search ............. 701/29.1, 701/29.4, 29.9, 30.5, 30.8, 30.9, 31.1, 32.1, 701/32.8, 32.9, 33.1, 33.7–34.4
See application file for complete search history.

(56) References Cited

U.S. PATENT DOCUMENTS

| 6,834,256 B2 * | 12/2004 | House et al. ............ 702/181 |
| 7,912,645 B2 * | 3/2011 | Breed et al. ............ 701/300 |
| 2008/0157510 A1 * | 7/2008 | Breed et al. ............ 280/735 |

* cited by examiner

*Primary Examiner* — Richard M. Camby
(74) *Attorney, Agent, or Firm* — John A. Miller; Miller IP Group, PLC

(57) ABSTRACT

A system and method for providing component and sub-system state of health prognosis in a complex system using fault models and component aging models. The method includes determining a current state of health value for a sub-system using fault signature test results and determining current state of health values for a plurality of components in the sub-system using the fault signature test results. The method also determines current state of health values for components in the system that cannot use fault signature test results using a first probability model and the current state of health values for the plurality of components. The method determines predicted future state of health values for the components in the sub-system using component aging models and determines a predicted future state of health value for the sub-system using a second probability model and the future state of health values of the components.

18 Claims, 3 Drawing Sheets

HEALTH PROGNOSIS FOR COMPLEX SYSTEM USING FAULT MODELING

BACKGROUND OF THE INVENTION

1. Field of the Invention

This invention relates generally to a system and method for determining the future state of health of components and sub-systems in a complex system and, more particularly, to a system and method for determining the future state of health of components and sub-systems in a complex system that uses system design fault models and component aging models.

2. Discussion of the Related Art

Modern vehicles are complex electrical and mechanical systems that employ many components, devices, modules, sub-systems, etc. that pass electrical information between and among each other using sophisticated algorithms and data buses. As with anything, these types of devices and algorithms are susceptible to errors, failures and faults that affect the operation of the vehicle. When such errors and faults occur, often the affected device or component will issue a fault code, such as diagnostic trouble code (DTC), that is received by one or more system controllers identifying the fault, or some ancillary fault with an integrated component. These DTCs can be analyzed by service technicians and engineers to identify problems and/or make system corrections and upgrades.

Vehicle fault models that define the faults that could occur in a vehicle and the remedies available for those faults are becoming more prevalent in the industry. One of the most simplistic representations of a fault model is a two-dimensional matrix where the rows of the matrix capture the failure modes that could occur on the vehicle and the columns of the matrix identify the symptoms that the vehicle may experience for the failure modes. The fault model captures the causal dependencies among the failure modes and symptoms. The various symptoms could be information that is recorded during operation of the vehicle, or information that is occurring while the vehicle is being serviced. Thus, by placing an indicator at the cross-section between a particular failure mode and the symptoms that the vehicle would undergo for those failure modes in the fault model, service personnel can identify what service operation needs to be performed based on the symptoms that are occurring to correct a particular failure.

As discussed above, fault modeling has been employed to diagnose component and sub-system problems in complex vehicle systems. Diagnostic modeling includes determining the root cause of a problem that has already occurred. Known fault modeling methods for diagnosing component and sub-system faults may use Bayesian networks, dynamic Bayesian networks, hidden Markov models, fuzzy logic, belief networks, Petri net, etc. However, fault modeling has heretofore not been used to provide the prognosis for the future state of health of complex systems. As a system becomes more complex the ability to provide system health prognosis becomes more difficult, but just as necessary.

It is also known in the art to employ component aging models, such as Arrhenius equation models, Paris equation models, etc., to estimate the age of a component in a system. However, such aging models have not been extended to systems, especially complex systems.

SUMMARY OF THE INVENTION

In accordance with the teachings of the present invention, a system and method are disclosed for providing component and sub-system state of health prognosis in a complex system using fault models and component aging models. The method includes collecting fault signature test results, determining a current state of health value for a sub-system using the fault signature test results and determining current state of health values for a plurality of components in the sub-system using the fault signature test results. The method also determines current state of health values for components in the system that cannot use fault signature test results using a first probability model and the current state of health values for the plurality of components. The method determines predicted future state of health values for the components in the sub-system using component aging models and determines a predicted future state of health value for the sub-system using a second probability model and the future state of health values of the components. The method then determines if the predicted state of health value for the sub-system is greater than a threshold, and if not, determines the remaining useful life of the sub-system using a time when the predicted state of health value falls below the threshold.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing state of health prognosis of components and sub-systems in a complex system using fault models and aging models is merely exemplary in nature, and is in no way intended to limit the invention or its applications or uses. For example, the system and method being described herein have particular application for providing state of health prognosis for complex vehicle systems. However, as will be appreciated by those skilled in the art, the system and method will have other non-vehicle applications.

As will be discussed in detail below, the present invention employs fault models and component aging models to provide state of health prognosis for components and sub-systems in a complex system. The complex system can be any complex system suitable for fault modeling analysis, such as vehicle systems. The fault model can be any fault model suitable for the purposes described herein, such as Bayesian network models, dynamic Bayesian network models, hidden Markov models, fuzzy logic models, belief network models, Petri net models, etc. The component aging models can be any component aging model suitable for the purposes described herein, such as Arrhenius equation models, Paris equation models, etc.

Figure 1:
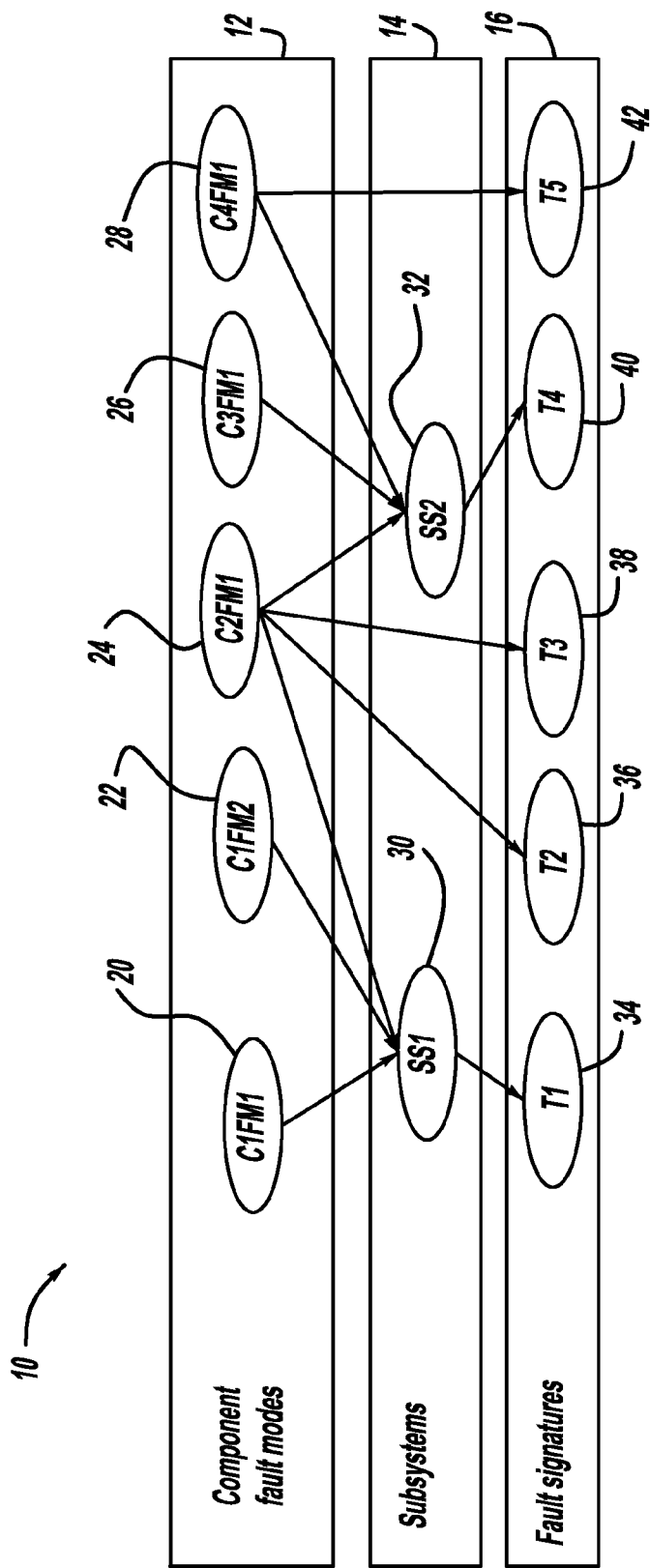
FIG. 1 is an illustration of an architecture of a complex system model.

FIG. 1 is an illustration of a model architecture 10 including a component level 12 showing component fault modes, a sub-system level 14 including sub-systems and a fault signature level 16 including component and sub-system fault signature tests. The component level 12 includes component 1, fault mode 1 (C1FM1) at node 20, C1FM2 at node 22, C2FM1 at node 24, C3FM1 at node 26 and C4FM1 at node 28. Thus, each of the nodes 20, 22, 24, 26 and 28 defines a fault or failure that could occur for each particular component in the system. Each component may have multiple fault modes. For example, a vehicle battery has a state of charge where the battery can be recharged and be reused. Its state of health can be diagnosed based on its age where as the age of the battery increases, it may not be able to be suitably recharged.

The sub-system level 14 includes sub-system 1 (SS1) at node 30 and a SS2 at node 32. The arrows from the component fault nodes 20-28 to the sub-systems 30 and 32 identify which components are in which particular sub-system, and thus, what components can be used to determine a state of health value for the particular sub-system. The fault signature level 16 includes test 1 (T1) at node 34, T2 at node 36, T3 at node 38, T4 at node 40 and T5 at node 42, where the tests are designed to determine the state of health of a particular component or sub-system. The tests can be based on sensor readings, various measurements, such as temperature, pressure, etc., aging algorithms, simulations, expert knowledge, etc. The arrows from the component fault nodes 20-32 to the test nodes 34-42 identify which tests can be performed on which components to determine the component's state of health. Note that some of the components do not have fault signature tests that can be used to determine the state of health of the component. Likewise, the arrows from the sub-systems 30 and 32 to the test nodes 34-42 identify which tests can be performed on the sub-systems 30 and 32 to identify the sub-system's state of health.

As mentioned above, the state of health of the sub-systems 30 and 32 can be determined by a particular fault signature test, namely, T1 for the sub-system 30 and T4 for the sub-system 32. Alternatively, the state of health of the sub-systems 30 and 32 can be inferred from the state of health of the components C1, C2, C3 and/or C4 that are in the particular sub-system, if the latter are known. The state of health of a particular component can be determined by direct fault signature tests, such as tests T2 and T3 for component C1, and T5 for component C4. Alternatively, if direct fault signature tests are not available, the state of health of a particular component can be inferred from its related sub-system and components. For example, the state of health of component C3 can be inferred from the state of health of components C2, and C4 and sub-system 32. In those cases where neither the direct test exists nor the system-model based inference is available, the state of health of a particular component can be determined by prior probability P based on historical failure rate of the component. The discussion above will be further illustrated below.

When neither direct tests nor system-model based inference is available, the probability distribution that a particular component will be at a different level of state of health as a result of a particular fault mode can be determined based on manufacturer provided failure rate or historical component failure rate. This probability distribution is called prior probability distribution. For example, Table 1 below gives the probability distribution that component 1 is at different levels of state of health, such as 1, which means totally healthy, 0.5 and 0, which means totally failed, namely, the probability P is 0.95, 0.03 and 0.02, respectively.

TABLE 1

| Prior Probability of C1FM1 at certain SOH P(SOH_C1FM1) | | |
|---|---|---|
| SOH = 1 | SOH = 0.5 | SOH = 0 |
| 0.95 | 0.03 | 0.02 |

The combination of the test state of health values for the components in a sub-system can be used to determine the probability distribution that the sub-system will be at different levels of state of health. The left side of Table 2 below gives state of health values for components C2, C3 and C4 for fault mode 1 and the right side of Table 2 gives a conditional probability P that the sub-system 32 will be at different levels of state of health based on the combination of the state of health values for those components. For example, for a test state of health value 1 for each of the components C2, C3 and C4, the probability P is 0.9 that the sub-system 32 is at state of health value 1, where 1 means totally healthy, the probability is 0.1 that the sub-system 32 is at state of health of value 0.5, and the probability is 0 that the sub-system 32 is at state of health of value 0, where 0 means totally failed. Likewise, for a test state of health value 0.5 for fault mode 1 for component C2, a test state of health value 1 for fault mode 1 for component C3 and a test state of health value 0.5 for fault mode 1 for component 4, the probability is 0.5 that the sub-system 32 is in the state of health value 1, the probability is 0.25 that the sub-system 32 is in the state of health value 0.5, and the probability is 0.25 that the sub-system 32 is in the state of health value 0.

The probability distribution over different levels of state of health is used to determine whether the sub-system 32 needs to be replaced or repaired. Depending on the specific application, the criteria can be different. For example, in a very restrictive criterion, the sub-system 32 is considered failed if the probability is more than 0.2 that the sub-system 32 is at the state of health value 0.

TABLE 2

| C2FM1 | C3FM1 | C4FM1 | Conditional Probability of SS2 at certain SOH P(SOH_SS2\| SOH_C2, C3, C4) | | |
|---|---|---|---|---|---|
| SOH | SOH | SOH | SOH = 1 | SOH = 0.5 | SOH = 0 |
| 1 | 1 | 1 | 0.9 | 0.1 | 0 |
| 0.5 | 1 | 0.5 | 0.5 | 0.25 | 0.25 |
| ... | ... | ... | ... | ... | ... |
| 0 | 0 | 0 | 0 | 0 | 1 |

As mentioned above, fault signature tests can be used to determine the state of health of components and sub-systems. In the non-limiting example shown by the architecture 10, tests T1 and T3 can be used to determine the state of health of component C2 and test T5 can be used to determine the state of health of component C4. However, some components do not have fault signature tests where their state of health cannot be determined in this manner. For example, component C3 does not have a particular test associated with it that allows its state of health to be directly determined. However, the state of health of component C3, in this example, can be estimated based on the state of health of the sub-system 32, the component C2 and the component C4, all of which do have fault signature tests associated with them, because they are all part of the same system.

Equation (1) below shows one non-limiting example of a fault model equation for determining the probability that the component C3 is at a particular state of health level $h_{C3}$ based on the knowledge of the state of health level $h_{SS2}$ of the sub-system 32, the state of health level $h_{C2}$ of the component C2, the state of health level $h_{C4}$ of the component C4 and the conditional probability P illustrated in Table 2.

$$PP\{S_{OH}(C_3) = h_{c3} \mid S_{OH}(SS_2) = h_{ss2}, S_{OH}(C_2) = h_{c2}, S_{OH}(C_4) = h_{c4}\} = \quad (1)$$

$$\frac{\begin{array}{c} P\{S_{OH}(SS_2) = h_{ss2} \mid S_{OH}(C_2) = h_{c2}, \\ S_{OH}(C_3) = h_{c3}, \\ S_{OH}(C_4) = h_{c4}\} * P\{S_{OH}(C_2) = h_{c2}\} * \\ P\{S_{OH}(C_3) = h_{c3}\} * P\{S_{OH}(C_4) = h_{c4}\} \end{array}}{\begin{array}{c} P\{S_{OH}(SS_2) = h_{ss2} \mid S_{OH}(C_2) = h_{c2}, \\ S_{OH}(C_3) = h, S_{OH}(C_4) = h_{c4}\} * P\{S_{OH}(C_2) = h_{c2}\} \\ \sum_{h \in e\{0,0.5,1\}} * P\{S_{OH}(C_3)\} = h * P\{S_{OH}(C_4) = h_{c4}\} \end{array}}$$

Based on the discussion above, the state of health of the components and sub-systems in a complex system can be evaluated at a certain point in time. Once the state of health of each component and sub-system is determined, then an estimated useful remaining life of the component and/or sub-system can be determined. For example, at each time step $\tau$ during a state of health evaluation process, an algorithm can determine the state of health for those components and sub-systems that have known fault signature tests. As discussed above, because the sub-system 32 includes the components C2, C3 and C4, and the components C2, C3 and C4 and the sub-system 32 can use fault signature tests T2-T5 to determine their state of health, those state of health values for the current time period can be determined. Further, at each time step $\tau$ during the evaluation process, the state of health of the other components that do not have a fault signature tests can be inferred using the model equation (1).

Once the algorithm has the state of health values for all of the components and sub-systems in the system, it can predict the state of health for the components and sub-systems at future times, and thus predict the remaining useful life of these components and sub-systems. If future time value $\tau$ is set equal to time t, the state of health of each component at $\tau+1$ can be determined using component aging models, such as:

$$SOH_C(\tau) = g[SOH_C(\tau-1), u] \quad (2)$$

Where u is an environmental variable.

The algorithm can then infer the state of health at time $\tau+1$ for the sub-systems using the system model described in Table 2. If the state of health of a sub-system at time $\tau+1$ is greater than a threshold, then time $\tau$ is advanced another time increment to provide a prediction of the state of health of the sub-system further into the future. Once the time has been advanced into the future far enough where the state of health of the sub-system is less than the threshold, the future time period and the current time period can be subtracted to give the remaining useful life (RUL) of the sub-system.

Figure 2:
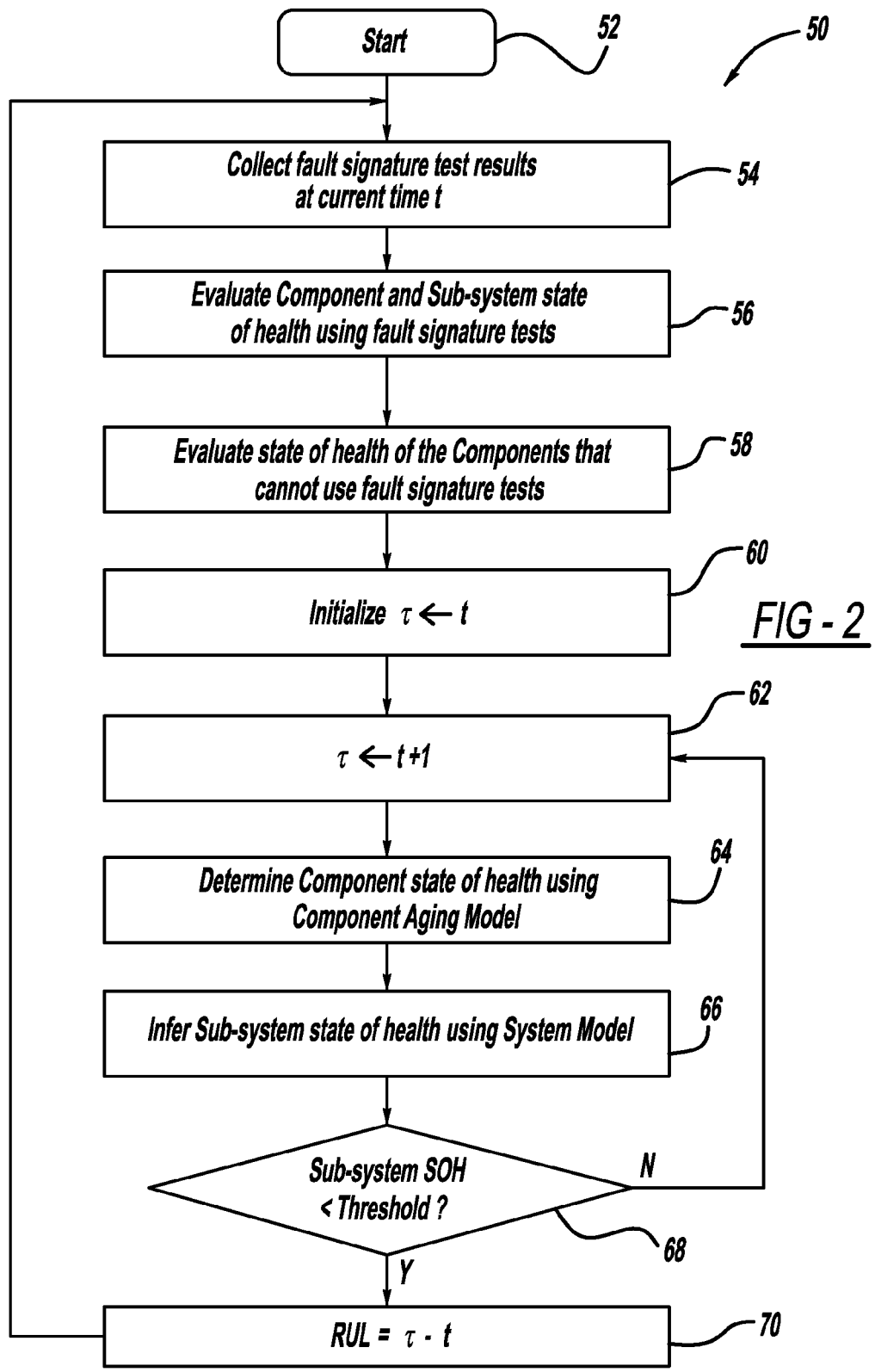
FIG. 2 is a flow chart diagram showing a process for providing state of health prognosis for a system using the architecture model in FIG. 1.

FIG. 2 is a flow chart diagram 50 showing this prediction process for the state of health of components and sub-systems in a complex system. The algorithm starts at box 52 and collects fault signature test results at a current time $\tau$ from the fault signature tests at box 54. The algorithm then determines the state of health of the sub-systems and components that are able to be determined from fault signature tests at box 56. The algorithm then determines the state of health of the components that are not able to be determined by fault signature tests using, for example, equation (2), at box 58. The algorithm then initializes the prediction time $\tau$ to be equal to time $\tau$ at box 60 and advances time $\tau$ by one prediction time increment at box 62. The algorithm then predicts the state of health of the components at the now future time period using component aging models, such as equation (3), at box 64, and infers the state of health of the sub-systems based on the component state of health using, for example, Table 2, at box 66. If the state of health of a particular sub-system is greater than a certain threshold at decision diamond 68 for this time period, then the time period $\tau$ is advanced another predicted time period at the box 62 and the process continues until the sub-system state of health for the future time is less than the threshold at the decision diamond 68. The difference between the current time $\tau$ and the future time $\tau$ is the remaining useful life of the sub-system at box 70.

Figure 3:
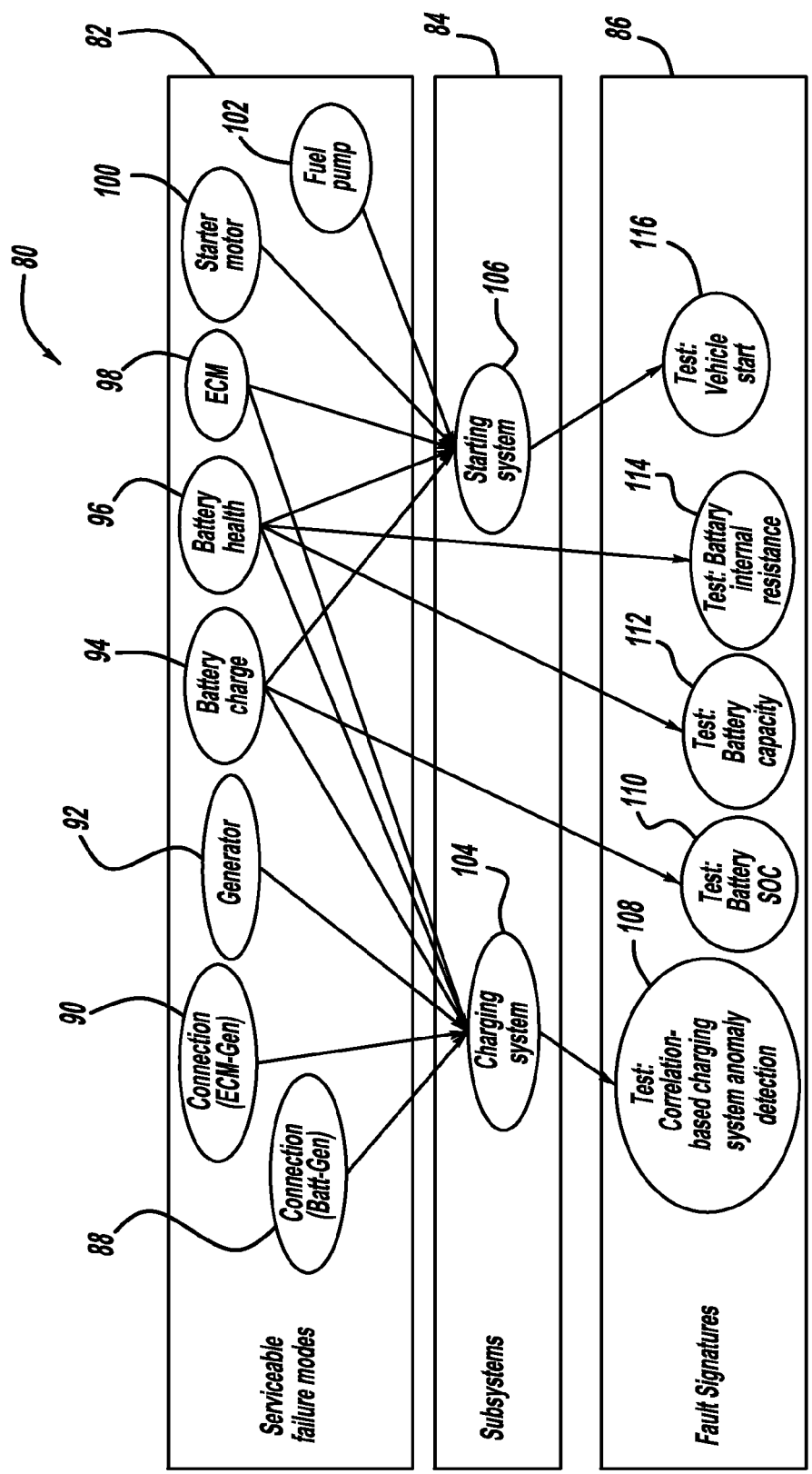
FIG. 3 is an illustration of an architecture of a system model for a vehicle electrical system.

FIG. 3 is an illustration of an architecture 80, similar to the architecture 10, for a specific complex system, namely, a vehicle electrical system including a battery. It is noted that the system battery has two different serviceable exterior modes, namely low charge and low health, and the battery health has multiple different component prognosis algorithms, tests and fault signatures. The architecture 80 includes a serviceable failure mode layer 82, a sub-system layer 84 and a fault signature layer 86. The failure modes include the battery-to-generator electrical connection at node 88, the electronic control module (ECM)-to-generator electrical connection at node 90, generator condition at node 92, the battery charge at node 94, the battery health at node 96, the ECS condition at node 98, the starter motor condition at node 100 and the fuel pump condition at node 102. The electrical sub-systems at layer 84 include the battery charging system at node 104 and the vehicle starting system at node 106. The fault signature tests at level 86 include correlation based on charging system anomaly detection at node 108, battery state of charge test at node 110, battery capacity test at node 112, the battery internal resistance test at node 114 and a vehicle start test at node 116.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining the state of health of a sub-system in a system, said method comprising:
   collecting fault signature test results;
   determining a current state of health value for the sub-system using the fault signature test results;
   determining current state of health values of a plurality of components in the sub-system using the fault signature test results;
   determining current state of health values for components in the system that cannot use fault signature test results using a first probability model and the current state of health value for the sub-system and the current state of health values of the components determined by the fault signature test results;
   determining predicted future state of health values for the components in the sub-system using component aging models;
   determining a predicted future state of health values for the sub-system using a second probability model and the future state of health value for the components;
   determining if the predicted state of health value of the sub-system is greater than a threshold; and determining the remaining useful life of the sub-system if the predicted state of health value of the sub-system is less than the threshold.

2. The method according to claim 1 further comprising advancing a future time period and determining predicted future state of health values for the components in the sub-system and determining a predicted state of health value for the sub-system if the predicted state of health value of the sub-system at the future time is less than the threshold.

3. The method according to claim 1 wherein determining a predicted future period state of health value for the sub-system using a second probability model includes using a fault model selected from the group consisting of Bayesian network models, dynamic Bayesian network models, hidden Markov models, fuzzy logic models, belief network models and Petri net models.

4. The method according to claim 1 wherein the aging model is selected from the group consisting of Arrhenius equation aging models and Paris equation aging models.

5. The method according to claim 1 wherein determining predicted state of health values using aging models includes using the equation:

$$SOH_C(\tau)=g[SOH_C(\tau-1),u]$$

where SOH is state of health, u is an environmental variable and $\tau$ is a time period.

6. The method according to claim 1 wherein determining current state of health values of a plurality of components using fault signature test results includes using fault signature test results based on sensor readings, measurements, simulations and expert knowledge.

7. The method according to claim 1 wherein the system is a vehicle system.

8. The method according to claim 7 wherein the vehicle system is a vehicle electrical system.

9. A method for determining the state of health of a sub-system in a system, said method comprising:
   determining predicted future state of health values for a plurality of components in the sub-system using component aging models;
   determining a predicted future state of health value for the sub-system using a probability model and the predicted future state of health values;
   determining if the predicted state of health value for the sub-system is greater than a threshold; and
   determining the remaining useful life of the sub-system if the predicted state of health value for the sub-system is less than the threshold.

10. The method according to claim 9 further comprising advancing a future time period and determining predicted future state of health values of the components in the sub-system and determining a predicted state of health value for the sub-system if the predicted state of health value of the sub-system at the future time is less than the threshold.

11. The method according to claim 9 wherein determining a predicted future period state of health value for the sub-system using a probability model includes using a fault model selected from the group consisting of Bayesian network models, dynamic Bayesian network models, hidden Markov models, fuzzy logic models, belief network models and Petri net models.

12. The method according to claim 9 wherein determining predicted state of health values using aging models includes using the equation:

$$SOH_C(\tau)=g[SOH_C(\tau-1),u]$$

where SOH is state of health, u is an environmental variable and $\tau$ is a time period.

13. The method according to claim 9 wherein the aging model is selected from the group consisting of Arrhenius equation aging models and Paris equation aging models.

14. A system for determining the state of health of a sub-system in a complex system, said system comprising:
   means for collecting fault signature test results;
   means for determining a current state of health value for the sub-system using the fault signature test results;
   means for determining current state of health values for a plurality of components in the sub-system using the fault signature test results;
   means for determining current state of health of values for components in the system that cannot use fault signature tests using a first probability model and the state of health values of the plurality of components;
   means for predicting future state of health values of the components in the sub-system using component aging models;
   means for determining a predicted future state of health values for the sub-system using a second probability model and the future state of health values of the components;
   means for determining if the predicted state of health value for the sub-system is greater than a threshold; and
   means for determining the remaining useful life of the sub-system if the predicted state of health value of the sub-system is less than the threshold.

15. The system according to claim 14 further comprising means for advancing a future time period and determining predicted future state of health values of the components in the sub-system and determining a predicted state of health value for the sub-system if the predicted state of health value of the sub-system at the future time is less than the threshold.

16. The system according to claim 14 wherein the means for determining a predicted future period state of health value for the sub-system uses a probability model includes using a fault model selected from the group consisting of Bayesian network models, dynamic Bayesian network models, hidden Markov models, fuzzy logic models, belief network models and Petri net models.

17. The system according to claim 14 wherein the means for determining predicted state of health values using aging models includes uses the equation:

$$SOH_C(\tau)=g[SOH_C(\tau-1),u]$$

where SOH is state of health, u is an environmental variable and $\tau$ is a time period.

18. The system according to claim 14 wherein the aging model is selected from the group consisting of Arrhenius equation aging models and Paris equation aging models.

* * * * *